US011403671B2

(12) United States Patent
Siljeg

(10) Patent No.: US 11,403,671 B2
(45) Date of Patent: Aug. 2, 2022

(54) METHOD OF MOBILE PHONE ADVERTISING

(71) Applicant: AWAKEN MOBILE PTY LTD, Bibra Lake (AU)

(72) Inventor: Nikola Siljeg, Bibra Lake (AU)

(73) Assignee: AWAKEN MOBILE PTY LTD

( * ) Notice: Subject to any disclaimer, the term of this patent is extended or adjusted under 35 U.S.C. 154(b) by 0 days.

(21) Appl. No.: 16/493,379

(22) PCT Filed: Mar. 14, 2018

(86) PCT No.: PCT/AU2018/050229
§ 371 (c)(1),
(2) Date: Sep. 12, 2019

(87) PCT Pub. No.: WO2018/165706
PCT Pub. Date: Sep. 20, 2018

(65) Prior Publication Data
US 2020/0027131 A1    Jan. 23, 2020

(30) Foreign Application Priority Data
Mar. 14, 2017 (AU) .............................. 2017900875

(51) Int. Cl.
*G06Q 30/00* (2012.01)
*G06Q 30/02* (2012.01)
(52) U.S. Cl.
CPC ..... *G06Q 30/0267* (2013.01); *G06Q 30/0261* (2013.01)

(58) Field of Classification Search
None
See application file for complete search history.

(56) References Cited

U.S. PATENT DOCUMENTS

| 2004/0077340 | A1* | 4/2004 | Forsyth | H04W 4/00 455/414.1 |
| 2006/0224430 | A1* | 10/2006 | Butt | G06Q 10/063116 705/7.19 |
| 2007/0178889 | A1* | 8/2007 | Cortegiano | G06Q 30/02 455/414.3 |
| 2008/0281940 | A1* | 11/2008 | Coxhill | G06Q 30/02 709/217 |
| 2009/0177736 | A1* | 7/2009 | Christensen | H04L 67/22 707/E17.108 |
| 2009/0303176 | A1* | 12/2009 | Chen | H04N 9/3176 345/156 |

(Continued)

FOREIGN PATENT DOCUMENTS

JP    2005244492 A    9/2005
JP    2014239478 A    12/2014
(Continued)

*Primary Examiner* — Matthew T Sittner
(74) *Attorney, Agent, or Firm* — Sand, Sebolt & Wernow Co., LPA

(57) ABSTRACT

Advertising is presented to the lock screen or also named the idle screen or time date screen of a phone when the phone is not in use, inviting the user to view or interact with the advertisement when they are not using the phone, rather than forcing the user to interact with the advertisement when they are wanting to use the phone for other purposes. Such a method of advertising is much less likely to annoy the user to the extent of current methods.

13 Claims, 3 Drawing Sheets

(56) References Cited

U.S. PATENT DOCUMENTS

| | | | |
|---|---|---|---|
| 2010/0088157 A1* | 4/2010 | Wilson | G06Q 30/02 455/414.1 |
| 2010/0167787 A1 | 7/2010 | Weisbrod | |
| 2010/0222046 A1* | 9/2010 | Cumming | H04M 1/72448 455/418 |
| 2012/0015693 A1* | 1/2012 | Choi | G06F 3/0482 455/566 |
| 2012/0196646 A1* | 8/2012 | Crinon | H04W 4/06 455/524 |
| 2012/0311582 A1* | 12/2012 | Bushell | G06F 9/542 718/100 |
| 2013/0088605 A1* | 4/2013 | Quarfordt | H04W 8/005 348/207.1 |
| 2013/0110565 A1* | 5/2013 | Means, Jr. | G06Q 10/06 705/7.11 |
| 2013/0304580 A1* | 11/2013 | Feadler | G06Q 30/0266 705/14.64 |
| 2014/0172579 A1* | 6/2014 | Peterson | G06Q 30/0269 705/14.66 |
| 2014/0173051 A1* | 6/2014 | Sagayaraj | H04L 65/4076 709/219 |
| 2014/0280516 A1 | 9/2014 | Flowers et al. | |
| 2014/0297417 A1* | 10/2014 | Cusack | G06Q 30/02 705/14.61 |
| 2014/0344055 A1* | 11/2014 | Sanghavi | G06Q 30/0272 705/14.55 |
| 2015/0019325 A1* | 1/2015 | Li | G06Q 30/0269 705/14.42 |
| 2015/0161666 A1 | 6/2015 | Wei et al. | |
| 2015/0213504 A1 | 7/2015 | Katz et al. | |
| 2016/0232578 A1* | 8/2016 | Jung | H04W 4/80 |
| 2016/0344824 A1 | 11/2016 | Wilden et al. | |

FOREIGN PATENT DOCUMENTS

| | | |
|---|---|---|
| JP | 2015061122 A | 3/2015 |
| JP | 2016040716 A | 3/2016 |
| JP | 2016099907 A | 5/2016 |
| KR | 1020140022976 | 2/2014 |

* cited by examiner

```
KeyguardManager myKM = (KeyguardManager)
context.getSystemService(Context.KEYGUARD_SERVICE);
        if (myKM.inKeyguardRestrictedInputMode()) {
                // it is locked
        } else {
                // it is not locked
        }
```

Fig.3

```
@Override
protected void onCreate(Bundle savedInstanceState) {
        super.onCreate(savedInstanceState);
        getWindow().addFlags(
                WindowManager.LayoutParams.FLAG_KEEP_SCREEN_ON |
                WindowManager.LayoutParams.FLAG_DISMISS_KEYGUARD |
                WindowManager.LayoutParams.FLAG_TURN_SCREEN_ON |
                WindowManager.LayoutParams.FLAG_SHOW_WHEN_LOCKED
        );
        setView(R.layout.activity_ads);
}
```

Fig.4

METHOD OF MOBILE PHONE ADVERTISING

FIELD OF THE INVENTION

The present invention relates to a method of presenting advertising on a mobile phone lock screen, also referred to as idle screen, time-date screen or screen saver.

BACKGROUND TO THE INVENTION

Advertising has long been used in various forms to subsidise the cost of owning and or operating mobile phones and their services. Some people also opt in to advertising just to keep informed about particular products or to take advantage of special offers.

A common system is to present the user with advertisements immediately after they have unlocked their phone before allowing them to proceed to the normal phone home screen. Such advertisements may be passive, merely showing images or video content, or interact with the user leading them to applications or web pages.

Interaction, such as swiping or clicking, may be required to ensure that the user has paid some attention to the advertising before their reward is provided. This method is called locked screen advertising and is not to be mistaken with our described invention.

A further system of advertising provides content on a user's home screen, such as banners or pop ups enticing the user to engage.

Both of the above methods of advertising cause inconvenience to the user as they intrude when the user wants to use their phone, often leading to the advertising being disabled by the user.

The object of this invention is to provide a method of advertising on the lock screen or idle screen of a mobile phone to alleviate the above problem, or at least provide the public and businesses with a useful alternative.

SUMMARY OF THE INVENTION

In a first aspect the invention comprises A method of displaying advertising on a mobile phone, comprising the steps of: a) waiting for the phone to enter a locked state; b) waiting for a display trigger; and c) retrieving and displaying advertising content on the phone.

The display trigger may be the completion of a time interval, which may be zero seconds, or a geolocation event.

The advertising content may be retrieved from a store within the phone, or retrieved from a remote server.

In preference the display of the advertising content is enabled dependent on the orientation of the phone, detection of movement of the phone, detection of humans by the phone, and/or the battery level of the phone.

Preferably the method further includes the steps of giving an alert and waiting for acknowledgement of the alert before displaying the advertising content.

It should be noted that any one of the aspects mentioned above may include any of the features of any of the other aspects mentioned above and may include any of the features of any of the embodiments described below as appropriate.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 3 shows a code snippet for an Android system for determining when a device is locked.

FIG. 4 shows a code snippet for an Android system for displaying a window on a locked device.

DETAILED DESCRIPTION OF THE INVENTION

Figure 1:
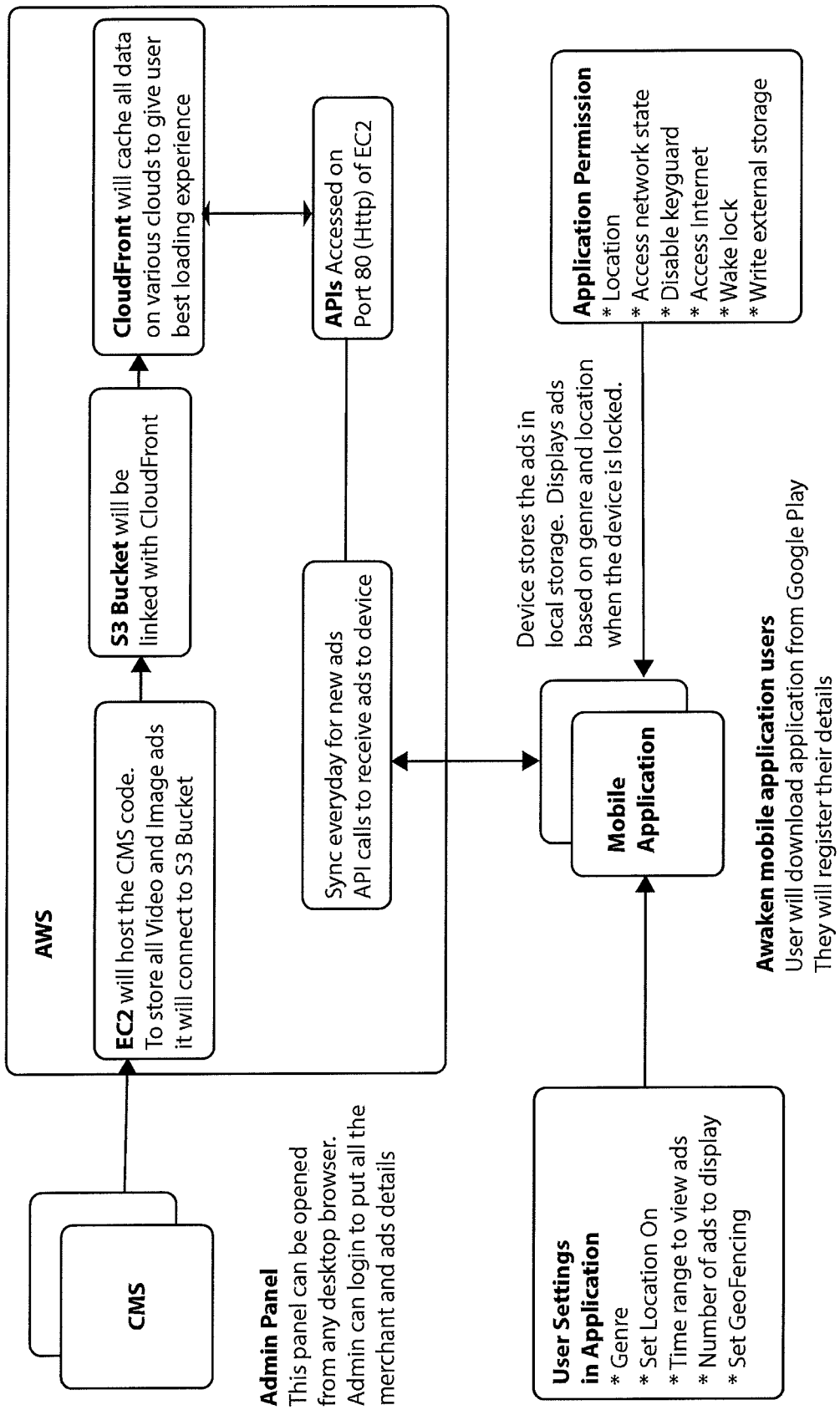
FIG. 1 shows a block diagram of a lock screen advertising system supporting the method of the invention.

The following detailed description of the invention refers to the accompanying drawings. Wherever possible, the same reference numbers will be used throughout the drawings and the following description to refer to the same and like parts. Dimensions of certain parts shown in the drawings may have been modified and/or exaggerated for the purposes of clarity or illustration.

The present invention provides a protocol or method of advertising on the lock screen or idle screen or also called time date screen of a mobile phone (note all mentioned are one and the same locked state). This is different to prior art systems in that it activates without action by the user. Many prior art systems are referred to as lock screen advertising but in fact display advertisements after the phone has been unlocked or as the user is trying to unlock the phone. The advertising of the present method is presented when the phone is not in use or engaged with, inviting the user to view or interact with the advertisement when they are not using the phone, rather than forcing the user to interact with the advertisement when they are wanting to use the phone for other purposes like current locked screen advertising methods attempt. Such a method of advertising is much less likely to annoy the user to the extent that they disable the advertising. Users have the advantage of using this mobile real estate to assist and be of benefit to businesses and consumers alike by presenting offers and or discounts if users are invited or take notice of businesses in a new manner in a current age where standing out and enticing customers are at all-time lows.

A system supporting the method of the invention is shown in FIG. 1. The system may take many forms as are known in the art, a preferably manner to implement is using Amazon Web Services (AWS) to implement a Content Management System (CMS) and a mobile application on a user's phone for displaying the advertising content but not limited to.

The CMS is implemented as a virtual service in Amazon's Elastic Compute Cloud (EC2) and manages the storage and retrieval of advertising material in a Simple Storage Solution (S3) Bucket. Amazon's CloudFront service is used to cache data as appropriate to improve loading speeds for users. The CMS provides an administration panel for administrators to configure the system and upload advertising content, and an API (Application Programming Interface) that is accessed by the mobile application to retrieve advertising content. The advertisement content is uploaded with preference of category and geographical location.

Figure 2:
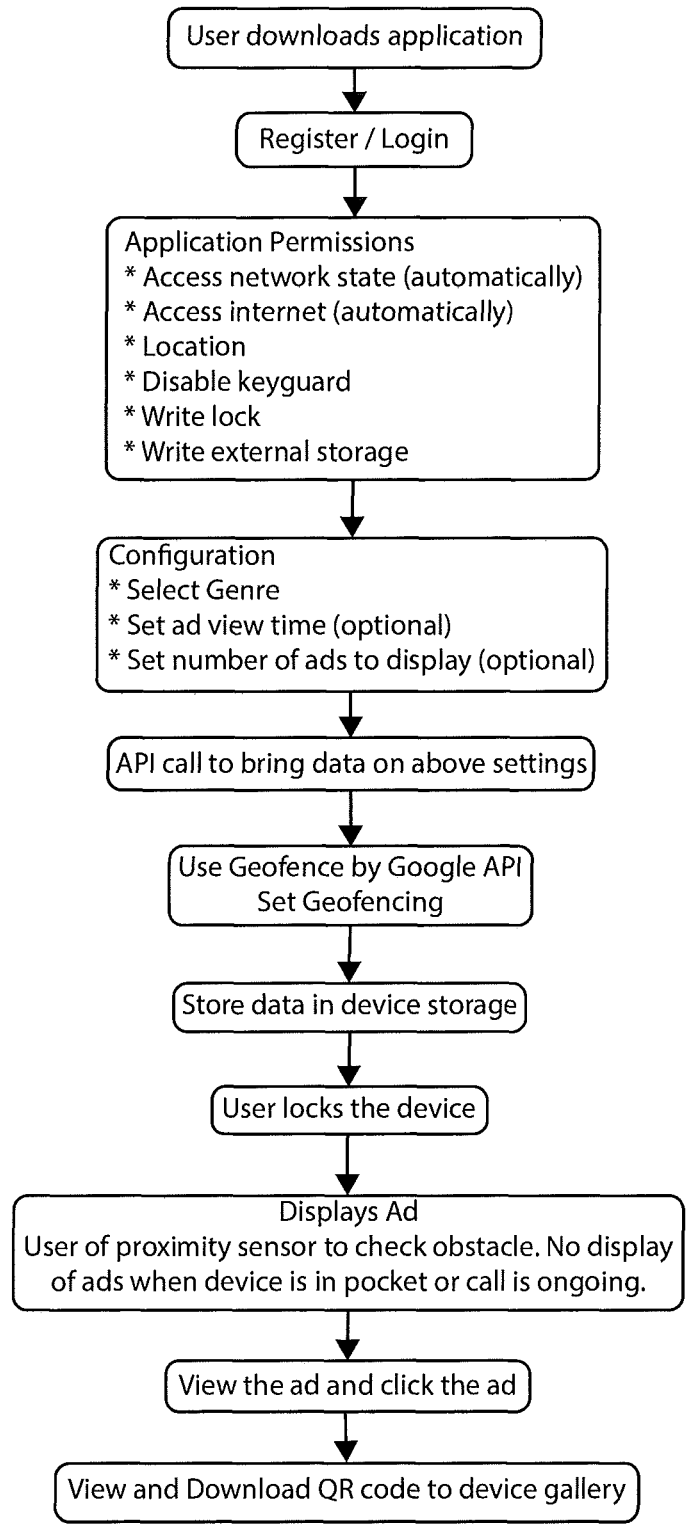
FIG. 2 shows an application flowchart for the user application that supports the method of the invention.

The user application may either be supplied pre-installed on a phone, as in when used to subsidise the cost of the phone or downloaded and installed by a user or SOK into an existing application. The description will focus on the user installed version of the application in which the user has full control of the application settings. In the pre-installed version only, a subset of the settings are available for the user to adjust, depending on the vendors requirements. An application flowchart for the user application is shown in FIG. 2.

The application flowchart begins with the user downloading and installing the application. On first use the user registers with the system, providing details which help target advertising such as gender and age. The user then grants permission to the application to access various services such as access to the internet, local storage and location services.

The user may then configure the behaviour of the system, setting parameters such as the genre, frequency and geo location of the advertisements presented, the time periods during which adverts may be presented (presentation window), and the format of adverts such as still images, videos and/or sound.

Once the application has been configured, the application will call the CMS API to download advertising content that matches the settings and geographical location and store it locally for later display. The content downloaded may also depend on the user's location, allowing advertising from local businesses. Advertising content will be regularly updated, preferably daily and after any changes have been made to the settings. Alternatively, advertising content can be downloaded just prior to display, allowing for adverts to be more specifically tailored to a user's location and the time of day.

After configuration and downloading advertising content the application is ready for ongoing operation and will wait until the phone has been locked before arming itself.

With the phone in the locked state, the application will wait for a trigger and suitable filter conditions to be satisfied presenting an advertisement to the user. The triggers and filters are discussed further below. Whilst presenting the advertisement the application will monitor for user interaction and act accordingly. Possible actions include directing the user to store or downloading a QR code to the device gallery for later interaction. The mobile device is at all times in a locked state, as in, if the home button was pushed the phones pin or password would required to be entered to unlock the device. Data regarding the display of advertisements and the user interaction is captured and returned to the CMS for analysis via the administration panel.

The application is triggered for displaying advertisements at a predetermined interval from when the phone is locked. Nominally advertisements are scheduled for display at regular intervals during the configured presentation window in accordance with the configured number of advertisements. The number of advertisements presented each day is monitored and the scheduling adjusted to take into account the user's use of the phone which could be set to prohibits advertisements from being displayed. For example if three advertisements were scheduled for display during 7:00 pm and 11:00 pm and the user was using the phone constantly between 8:00 pm and 9:00 pm then the three advertisements will be rescheduled for display after the phone is locked at 9:00 pm. The scheduling is dynamic and invoked whenever the phone is locked. The time scheduling may also be biased to presenting advertisements soon after the phone has been locked to increase the chance of interaction with the user. The scheduling can include a zero delay time so that advertising is displayed most likely whilst the user is still holding the phone.

The application may also be triggered for displaying advertisements using geolocation services, display an advertisement on entering a geolocation which is dependent on the geolocation. The display of location-based advertisements may be delayed until the nominal time-based display schedule is triggered.

The application includes several configurable filters which must be satisfied for an advertisement to be displayed, including phone orientation, phone movement, phones proximity sensor, user detection and battery level. Display of advertising is always inhibited during a phone call.

Using the internal orientation sensors of the phone, the application can determine the orientation of the phone and choose to display advertisements only if the phone is lying on a flat or elevated surface with the screen facing upwards, as a phone would be if left on a table or desk or cradle. Optionally the application may vibrate or sound a tone if not in a suitable position alerting the user to a pending advertisement and only showing the advertisement if responded to by the user.

The application may also monitor movement of the phone and if configured to inhibit the display of advertisements. This can prevent advertisements distracting a driver.

As the intent of advertising is to catch the attention of a user, the application can also be configured to only display advertisements in the presence of a user. This can be determined by monitoring the phones cameras for moving images indicative of the presence of a human so as to not randomly show or waste advertising opportunities.

The application also monitors the battery level of the phone and correspondingly restricts its activity to avoid draining a low battery.

The application can determine if the device is locked or not. Then bypass the systems notification service centre and display the ads on the locked or idle screen. FIGS. 3 and 4 respectively show code snippets for Android systems.

The method of the application is nominally implemented as a standalone application for advertising, however the underlying operation may also be implemented as a SOK (Software Development Kit), allowing other applications to operate on a locked screen.

The reader will now appreciate the present invention which provides a method of advertising on the lock screen or idle screen also named the time date screen of a mobile phone when the phone is not in use or engaged with.

Further advantages and improvements may very well be made to the present invention without deviating from its scope. Although the invention has been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus. Any discussion of the prior art throughout the specification should in no way be considered as an admission that such prior art is widely known or forms part of the common general knowledge in this field.

In the present specification and claims (if any), the word "comprising" and its derivatives including "comprises" and "comprise" include each of the stated integers but does not exclude the inclusion of one or more further integers.

The invention claimed is:
1. A method of displaying advertising comprising steps of:
providing a mobile phone with an idle screen;

providing an application on the mobile phone, wherein the application is configured for displaying advertising on the idle screen;

monitoring the mobile phone via the application, to determine when the mobile phone enters a locked state and the idle screen is displayed;

providing physical sensors on the mobile phone, wherein the physical sensors include sensors for detecting one or more of movement of the mobile phone, non-movement of the mobile phone, battery level of the mobile phone, and detecting humans in a vicinity of the mobile phone;

waiting, via the application, for a non-user initiated display trigger;

checking, via the application, for satisfaction of a configurable filter, wherein the configurable filter receives input from the physical sensors and wherein upon occurrence of the non-user initiated display trigger, the input from at least one of the physical sensors satisfies the configurable filter, enabling, via the application, the display of advertising content;

retrieving, via the application, advertising content; and displaying, via the application, the retrieved advertising content on the idle screen of the mobile phone while the mobile phone remains in the locked state.

2. The method of claim 1, wherein the non-user initiated display trigger is a completion of a time interval as determined by the application.

3. The method of claim 1, wherein the non-user initiated display trigger is a geolocation event as determined by the application, and when the geolocation event occurs, the advertising content is displayed.

4. The method of claim 1, wherein the advertising content is retrieved from by the application from one of a store within the mobile phone and a remote server.

5. The method of claim 1, wherein the physical sensors provided on the mobile phone include an accelerometer for detecting orientation of the mobile phone, and wherein the configurable filter to enable the display of the advertising content is satisfied when the input from the accelerometer indicates to the application that the orientation of the mobile phone being with the idle screen facing upwards.

6. The method of claim 1, wherein the configurable filter to enable the display of the advertising content is satisfied when the physical sensors detect no movement of the mobile phone.

7. The method of claim 1, wherein the configurable filter to enable the display of the advertising content is satisfied when the physical sensors detect humans in the vicinity of the mobile phone.

8. The method of claim 1, wherein the physical sensors include a battery level indicator, and the configurable filter to enable the display of the advertising content is satisfied by detection by the battery level indicator that the battery level of the mobile phone is above a threshold level.

9. The method of claim 1, wherein after retrieving the advertising content via the application, the method further comprises giving an alert on the mobile phone via the application, and waiting for acknowledgement of the alert by human interaction with the mobile phone, before displaying the advertising content.

10. The method of claim 1, further comprising:

providing an operating system of the mobile phone, wherein the operating system includes a systems notification center; and bypassing the systems notification center to display the advertising content on the idle screen of the mobile phone.

11. The method of claim 1, wherein the displaying of the advertising content is scheduled to occur at a predetermined time, and wherein the displaying of the advertising content is rescheduled whenever the mobile phone enters the locked state.

12. The method of claim 1, wherein the displaying of the advertising content is scheduled via the application, to occur at a predetermined time, and wherein the predetermined times is biased to be scheduled shortly after the mobile phone has entered the locked state.

13. The method of claim 7, further comprising:

providing a camera on the mobile phone as one of the physical sensors;

monitoring, with the camera, the detection of humans in the vicinity of the mobile phone; and displaying the advertising content when humans are detected in the vicinity of the mobile phone by the camera.

* * * * *